United States Patent
Jaiswal et al.

(10) Patent No.: US 11,283,751 B1
(45) Date of Patent: Mar. 22, 2022

(54) USING SPEECH AND FACIAL BIO-METRICS TO DELIVER TEXT MESSAGES AT THE APPROPRIATE TIME

(71) Applicant: INTERNATIONAL BUSINESS MACHINES CORPORATION, Armonk, NY (US)

(72) Inventors: Peeyush Jaiswal, Boca Raton, FL (US); Priyansh Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/949,552

(22) Filed: Nov. 3, 2020

(51) Int. Cl.
| | |
|---|---|
| *G06F 15/16* | (2006.01) |
| *G06F 9/54* | (2006.01) |
| *H04L 29/06* | (2006.01) |
| *H04L 51/224* | (2022.01) |
| *G10L 25/63* | (2013.01) |
| *H04L 51/00* | (2022.01) |
| *H04L 51/043* | (2022.01) |
| *H04L 51/18* | (2022.01) |
| *G06F 40/35* | (2020.01) |
| *G06V 40/16* | (2022.01) |

(52) U.S. Cl.
CPC .............. *H04L 51/24* (2013.01); *G06F 40/35* (2020.01); *G06V 40/174* (2022.01); *G10L 25/63* (2013.01); *H04L 51/043* (2013.01); *H04L 51/12* (2013.01); *H04L 51/18* (2013.01)

(58) Field of Classification Search
CPC ......... H04L 51/24; H04L 51/26; H04L 51/12; H04L 51/18; H04L 51/043; G10L 25/63
USPC ........................................................... 709/206
See application file for complete search history.

(56) References Cited

U.S. PATENT DOCUMENTS

| | | | |
|---|---|---|---|
| 9,105,047 B1 | 8/2015 | Curran | |
| 9,313,634 B2 | 4/2016 | Suzuki | |
| 9,460,473 B2 | 10/2016 | Deluca | |
| 9,513,867 B1 * | 12/2016 | Tokunaga | ............... G06F 3/165 |

(Continued)

FOREIGN PATENT DOCUMENTS

| | | |
|---|---|---|
| WO | 2017085714 A2 | 5/2017 |
| WO | 2018185988 A1 | 10/2018 |
| WO | 2020067710 A1 | 4/2020 |

OTHER PUBLICATIONS

H. Al Osman, A. F. Pilon and A. El Saddik, "Mobile phone short message tacton notification based on mood and urgency," 2014 IEEE International Symposium on Haptic, Audio and Visual Environments and Games (HAVE) Proceedings, 2014, pp. 76-81, doi: 10.1109/HAVE.2014.6954335. (Year: 2014).*

(Continued)

*Primary Examiner* — Hamza N Algibhah
(74) *Attorney, Agent, or Firm* — Samuel A. Waldbaum (57) ABSTRACT

Embodiments of the present invention disclose a method, computer program product, and system for delaying the notification of a new message arrival. Receiving a message from a sending computing device and determining a first mood of a user receiving the message. Determining a second mood of the content of the message and comparing the first mood to second mood. Delaying a transmission of a notification when the first mood and the second mood are different, wherein the notification is a sound or pop-up window that indicates the arrival of a message.

18 Claims, 5 Drawing Sheets

(56) References Cited

U.S. PATENT DOCUMENTS

| | | | |
|---|---|---|---|
| 9,665,567 B2 | 5/2017 | Liu | |
| 10,735,585 B1* | 8/2020 | Johnston | G06F 40/30 |
| 10,958,610 B2* | 3/2021 | Kozloski | G06F 40/30 |
| 2010/0057875 A1* | 3/2010 | Bychkov | H04M 1/7243 709/206 |
| 2010/0082751 A1* | 4/2010 | Meijer | G06F 15/16 709/206 |
| 2011/0041153 A1 | 2/2011 | Simon | |
| 2012/0089705 A1* | 4/2012 | French | H04N 7/18 709/219 |
| 2012/0158503 A1* | 6/2012 | Mardikar | G06Q 30/0255 705/14.53 |
| 2013/0083906 A1* | 4/2013 | Roberts | H04M 11/00 379/88.13 |
| 2013/0346515 A1 | 12/2013 | Deluca | |
| 2014/0094156 A1* | 4/2014 | Uusitalo | H04W 4/12 455/418 |
| 2014/0114899 A1* | 4/2014 | Wan | G06N 5/04 706/47 |
| 2016/0253552 A1* | 9/2016 | Rihn | G06F 3/015 382/224 |
| 2017/0083506 A1 | 3/2017 | Liu | |
| 2017/0270099 A1* | 9/2017 | Gorny | G06Q 30/01 |
| 2017/0308909 A1* | 10/2017 | Faith | G06K 9/00315 |
| 2018/0217968 A1* | 8/2018 | Bastide | G06F 40/151 |
| 2019/0058677 A1* | 2/2019 | Maekawa | G06T 11/206 |
| 2019/0171693 A1* | 6/2019 | Dotan-Cohen | G06T 11/206 |
| 2019/0215290 A1* | 7/2019 | Kozloski | G06N 20/00 |
| 2019/0333514 A1* | 10/2019 | Xu | G10L 25/63 |
| 2019/0386947 A1* | 12/2019 | Pavitt | H04L 51/16 |
| 2020/0092243 A1* | 3/2020 | Milligan | H04L 67/20 |
| 2020/0160386 A1* | 5/2020 | Chan | G06Q 30/0255 |
| 2020/0169525 A1* | 5/2020 | Cunico | H04L 51/34 |
| 2020/0286603 A1* | 9/2020 | Ajilore | G16H 20/70 |
| 2021/0112162 A1* | 4/2021 | Johnston | H04M 3/5175 |

OTHER PUBLICATIONS

Mell, et al., "The NIST Definition of Cloud Computing", National Institute of Standards and Technology, Special Publication 800-145, Sep. 2011, 7 pages.

* cited by examiner

USING SPEECH AND FACIAL BIO-METRICS TO DELIVER TEXT MESSAGES AT THE APPROPRIATE TIME

BACKGROUND

The present invention relates generally to the field of user notification, and more particularly to delaying notification of a new message arrival based on the user mood or the user activity.

Sending text messages, SMS, emails, or instant messages have become a main form of communications for people. In the current environment, people are being notified of text messages, emails, or instant messages when they arrive at the user computing device or have been posted on a linked application. A notification, e.g. a pop-up window, chime, etc., occurs when a text message, SMS, email, or instant message arrives on the user computing device.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for delaying the notification of a new message arrival. Receiving a message from a sending computing device and determining a first mood of a user receiving the message. Determining a second mood of the content of the message and comparing the first mood to second mood. Delaying a transmission of a notification when the first mood and the second mood are different, wherein the notification is a sound or pop-up window that indicates the arrival of a message.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Reference will now be made in detail to the embodiments of the present invention, examples of which are illustrated in the accompanying drawings, wherein like reference numerals refer to like elements throughout. Embodiments of the invention are generally directed to a system for automatically delaying notification of the arrival of text messages, SMS, emails, or instant messages based on the receiver's mood and/or status. Furthermore, the system can modify the content of the text messages, SMS, emails, or instant messages based on the receiver mood.

When the sender creates and sends a message, he is aware of his own mood and status, but the sender is not always aware of the receiver's mood and status. In most situations the receiver's mood and status are not considered when the notification is transmitted, where the notification indicates the arrival of new text messages, SMS, emails, or instant messages. For example, if the receiver's mood is determined to be happy and a new message arrives that contains sad content, then the system would delay the notification from being sent. The receiver computing device analyzes video and/or still picture images of the user and receives audio data from the user to determine the receiver's mood. The status of the receiver is referring to the activity the receiver is currently involved in, for example, the receiver could be in a business meeting or phone call, or drafting a document, etc. The receiver computing device analyzes video and/or still picture images of the user and receives audio data from the user to determine the receiver's status.

Most notification systems have a do not disturb function that stops all notifications while the setting is turned on. The issue with this system, is that it requires the receiver to manually turn on the do not disturb setting. The key is the receiver must actively turn on the do not disturb setting, but many people forget to turn on this system when they are busy.

The system of the present invention determines the status of the receiver and automatically delays notifications when the receiver's status is determined to be busy. So, when a message is received while the receiver is busy, the system delays the notification of the message arrival from being sent to the receiver. The notification is usually a pop-up window, an audio sound, or a combination thereof. However, the system does not delay delivery of the message, so if the receiver manually checks the messaging application then the received message will be there. Only the notification of the message is delayed, which prevents the notification window or sound from interrupting or disturbing the receiver. The delaying of the notification is an automatic process such that the receiver does not have to turn on the do not disturb setting in the notification system. The system of the present invention considers the receiver's status (e.g. busy or not) but also considers the receiver's mood when determining when the transmission of the notification of the message should be delayed.

The system analyzes the receiver's facial and speech biometrics to determine the receiver's mood when a message is received. The system determines the receiver's mood, e.g. happy, sad, angry, etc., and the system analyzes the content of the received message to determine the mood of the message, e.g. happy news, sad news, humorous, loving, etc. The system compares the receiver's mood to the mood of the message and can delay notification of the message arrival or the system can modify the message. The system can modify the message by changing parts of the message, for example, an emoji, within the message or other mood indicator elements (gifs, images, or stickers) to reflect the receiver's mood.

Figure 1:
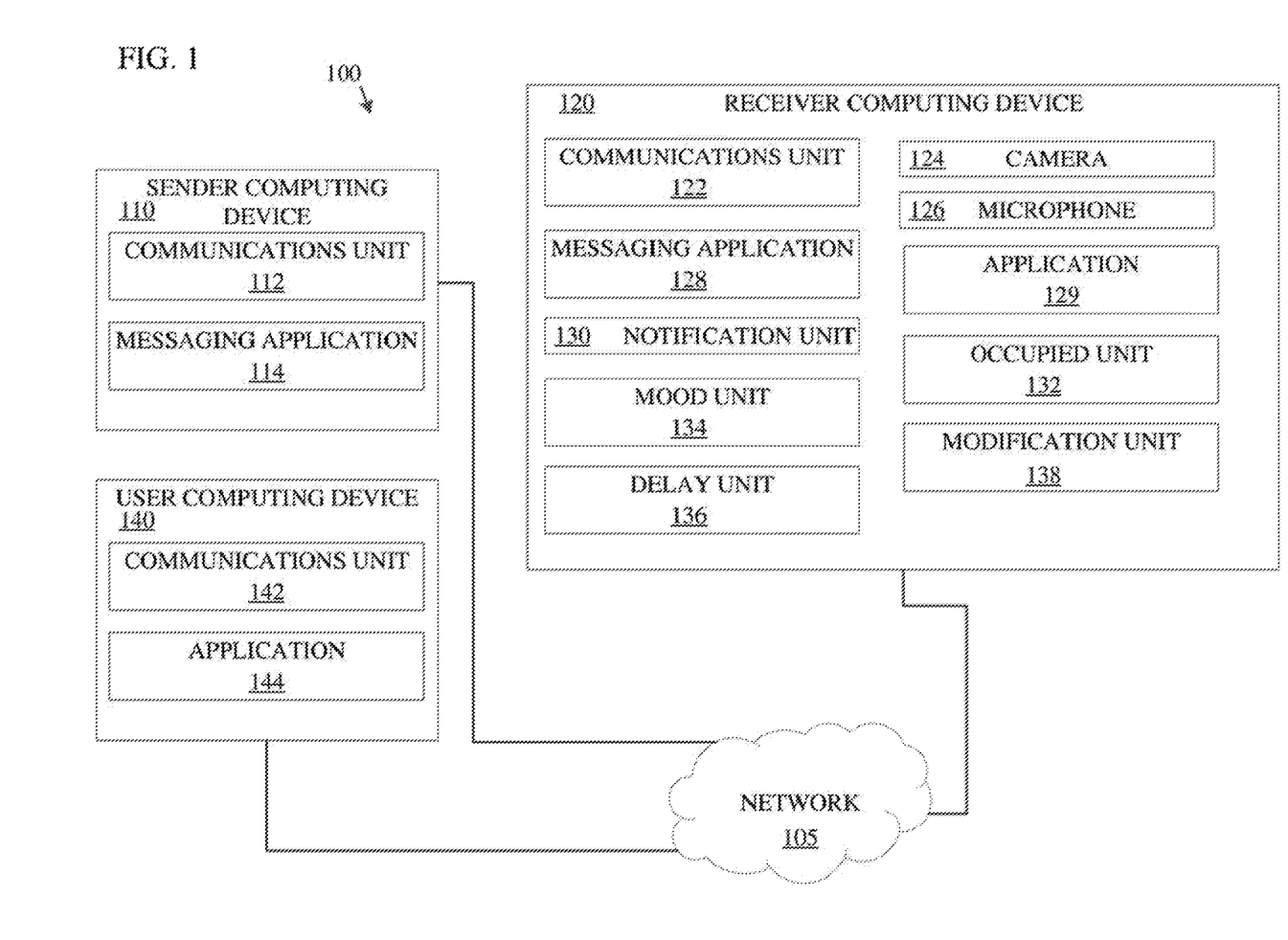
FIG. 1 is a functional block diagram illustrating a messaging environment, in accordance with an embodiment of the present invention.

FIG. 1 is a functional block diagram illustrating a messaging environment 100, in accordance with an embodiment of the present invention.

The messaging environment 100 includes a sender computing device 110, a receiver computing device 120, a user computing device 140, and network 105. Network 105 can be, for example, a local area network (LAN), a wide area network (WAN) such as the Internet, or a combination of the two, and can include wired, wireless, or fiber optic connections. In general, network 105 can be any combination of connections and protocols that will support communications between the sender computing device 110, the receiver computing device 120, and the user computing device 140.

Figure 4:
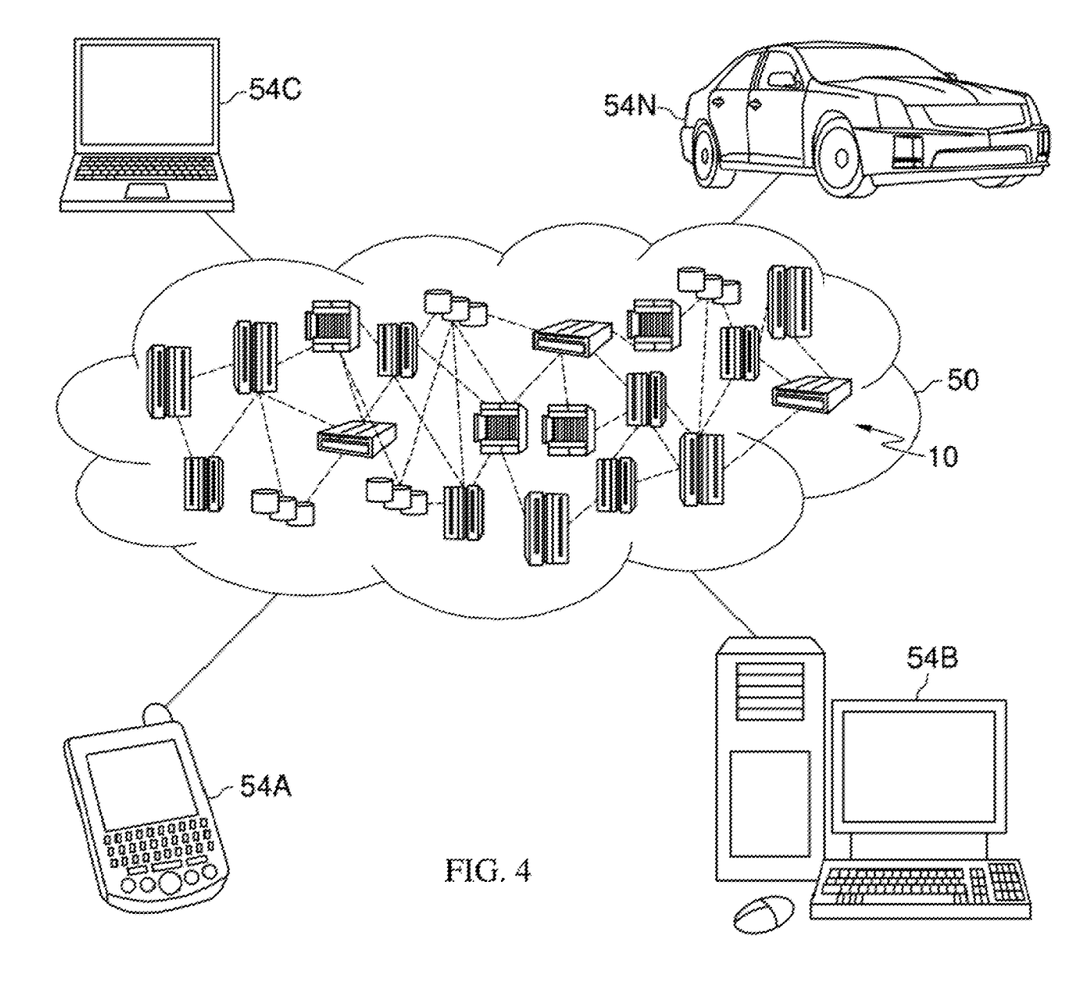
FIG. 4 depicts a cloud computing environment according to an embodiment of the present invention.
Figure 5:
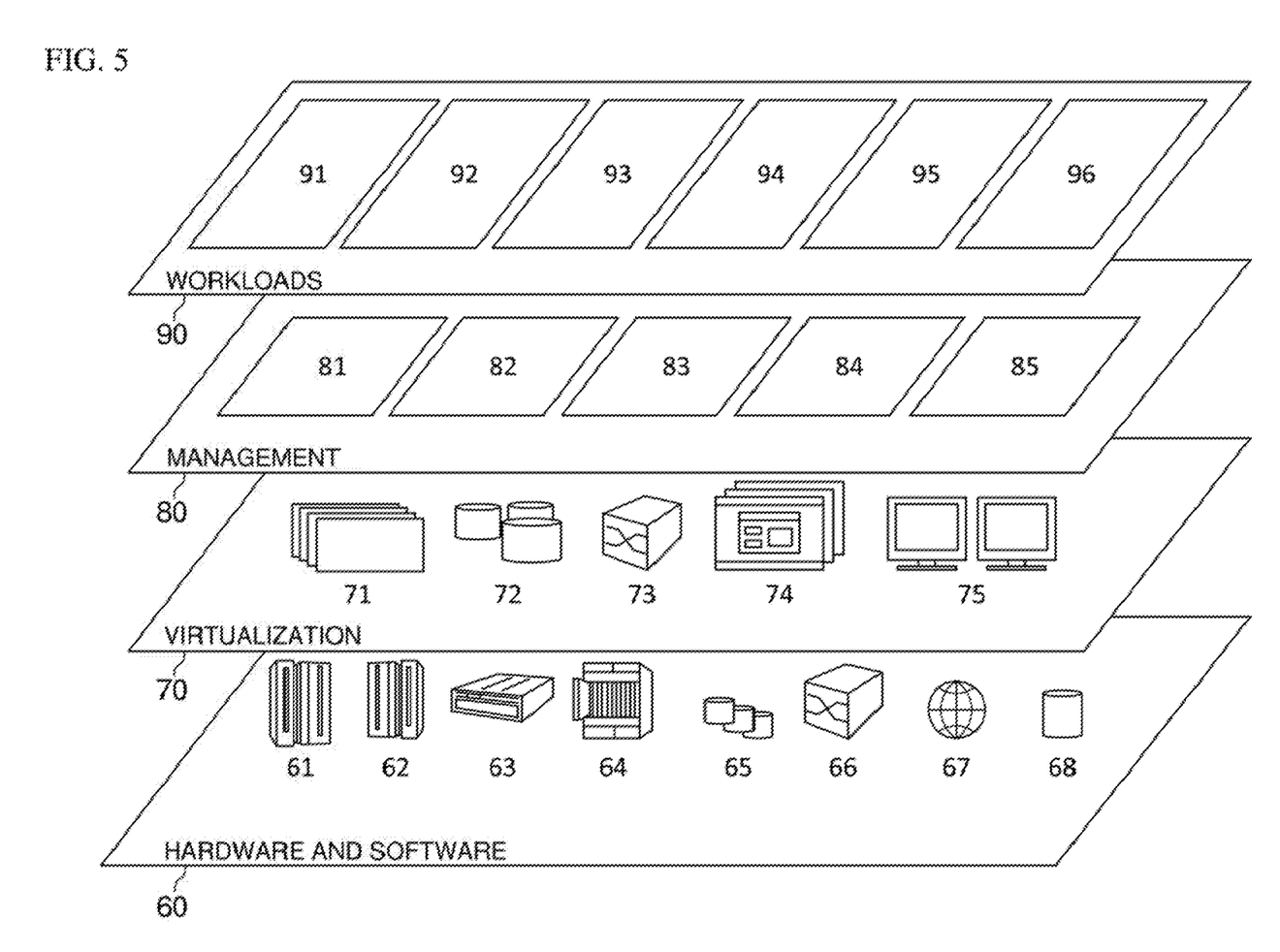
FIG. 5 depicts abstraction model layers according to an embodiment of the present invention.

The sender computing device 110 includes a communications unit 112, and a messaging application 114. The sender computing device 110 may be a laptop computer, tablet computer, netbook computer, personal computer (PC), a desktop computer, a personal digital assistant (PDA), a smart phone, or any programmable electronic device capable of communicating with receiver computing device 120 or user computing device 140 via network 105 and with various components. In other embodiments, sender computing device 110 may include internal and external hardware components, as depicted and described in further detail below with respect to FIG. 3, and operate in a cloud computing environment, as depicted in FIGS. 4 and 5.

The messaging application 114 is an application that allows a user to compose a message to be sent, where the message can include text, one or more emojis, one or more pictures, or other items. Messaging application 114 can be any type of application that is able to receive or send messages, for example, text messages, SMS messages, emails, or other type of messages. The communications unit 112 transmits the composed message, via the network 105, to the receiver computing device 120.

The receiver computing device 120 can include a communications unit 122, a camera 124, a microphone 126, a messaging application 128, an application 129, a notification unit 130, a occupied unit 132, a mood unit 134, a delay unit 136, and a modification unit 138. The receiver computing device 120 may be a laptop computer, tablet computer, netbook computer, personal computer (PC), a desktop computer, a personal digital assistant (PDA), a smart phone, or any programmable electronic device capable of communicating with sender computing device 110 or user computing device 140 via network 105 and with various components In other embodiments, sender computing device 110 may include internal and external hardware components, as depicted and described in further detail below with respect to FIG. 3, and operate in a cloud computing environment, as depicted in FIGS. 4 and 5.

The communications unit 122 allows for the receiver computing device 120 to transmit and receive data via the network 105. The camera 124 can take videos and/or still images of the user. The microphone 126 captures audio data from the user, for example, audio data can be the user talking on the phone, having a conversation with another person, talking to himself, or other audio data.

Messaging application 128 can be any type of application that is able to receive or send messages, for example, text messages, SMS messages, emails, or other type of messages. Application 129 is a program that the user can interact with, for example, a document creator, a photo/video editor, a game, or any other application the user can interact with.

The notification unit 130 receives information from the messaging application 128 that a new message has been received, and the notification unit 130 notifies the receiver that a message has arrived. The notification can be a sound, a pop-up window, or a combination thereof, that indicates to the user that a message has arrived. The notification unit 130 transmits the notification when the messaging application 128 receives the message. The notification unit 130 allows the user to manually turn off notifications, where the user can permanently or temporally turn off notifications.

The occupied unit 132 determines if the user is occupied doing some type of activity. The occupied unit 132 detects if the user is utilizing application 129 by receiving data from application 129. The occupied unit 132 receives video/still images from the camera 124 and audio data from the microphone 126 to determine if the user is involved in an activity. For example, the microphone 126 picks up audio data and the camera 124 takes an image of the user being on the phone, then the occupied unit 132 determines that the receiver status is busy. Another example, the microphone 126 picks up audio data of the user and another individual, and the camera 124 takes an image of the user sitting casually in a chair, then the occupied unit 132 determines that the receiver status is busy since he is having a conversation with the another individual.

Another example, the occupied unit 132 receives data from another device (e.g. the user computing device 140) that the user is currently interacting with. For example, if the receiver computing device 120 is a cellular telephone, but the receiver can be interacting with the user computing device 140 (laptop or desktop computer). The occupied unit 132, located on the receiver computing device 120 (e.g. cellular phone), receives information that the receiver is working on the user computing device (e.g. laptop), thus the occupied unit 132 determines that the receiver is busy since he is utilizing a connected device. The user computing device 140 includes a communications unit 142 and at least an application 144. The communications unit 142 allows for the user computing device 140 to transmit and receive data via the network 105. Application 144 is a program that the user can interact with, for example, a document creator, a photo/video editor, a game, or any other application the user can interact with. The occupied unit 132 receives data (e.g. from the user computing device 140) that the user is utilizing application 144, thus the occupied unit 132 determines the receiver status is busy.

The delay unit 136 interacts with the notification unit 130 and receives notices that a notification is about to be sent to the receiver indicating a message has arrived. The delay unit 136 receives the status (i.e. busy or not) of the receiver from the occupied unit 132. When the receiver has a busy status, then the delay unit 136 automatically delays the notification of the arrival of the new message from being sent to the receiver. The delay unit 136 periodically checks on the receiver status to see if the receiver status has changed. When the delay unit 136 receives a change of the receiver status to not being busy, then the delay unit 136 removes the delay of the notification of the received message caused by the busy status. At this point the notification unit 130 can send out the notification of the message arrival if no other delay is warranted.

The delay unit 136 can also delay the notification unit 130 from transmitting the notification to the receiver based on the receiver's mood. The mood unit 134 receives video images and still images from the camera 124 and receives audio data from the microphone 126. The video images and still images can be of the receiver's face and/or the receiver's body. The images of the receiver's face can illustrate different facial expressions and the images of the receiver's body can illustrate his body language. The content of the video and still images is dependent on the field of view of the camera 124. The mood unit 134 utilizes facial recognition to analyze the video and/or still images to identify the mood of the receiver. The facial recognition compares multiple faces together to identify different emotions displayed in the images. The emotion displayed on the receiver's face can be, for example, happy, angry, sad, neutral, surprise, disgust, fear, etc. The mood unit 134 utilizes a speech/voice recognition API to analyze the audio data to identify the emotion of the receiver. The speech/voice recognition API analyzes the receiver's tone, pitch, vocabulary, cadence, tempo, etc. to determine the receiver's mood from the audio data. The mood unit 134 uses natural language processing to analyze the content of the received message to determine the mood of the message. The natural language processing identifies the mood of the content and any mood indicators, for example, emojis. The mood unit 134 can identify one or more different moods that might be inferred from the content of the message.

The delay unit 136 receives the mood of the receiver and mood of the content of the message from the mood unit 134. The delay unit 136 compares the receiver's mood to the mood of the content of the message to see how the moods relate to each other. The moods can be the same, for example, both happy, sad, etc., the moods can be different, for example, the receiver's mood can be happy while the mood of the message is angry, or the moods can be similar to each other, for example, the receiver's mood can be happy and the mood of the message could be humorous. The delay unit 136 does not delay the notification of the message being sent to the receiver when the moods of the receiver and the content are the same or similar. The delay unit 136 automatically delays the notification of the message arrival from being sent when the mood of the receiver and the mood of the content of the message are different from each other. The delay unit 136 periodically checks on the receiver's mood to see if the receiver's mood has changed. The delay unit 136 removes the delay on the notification from being sent when the delay unit 136 receives a change of the receiver's mood and the receiver's mood is the same or similar to the mood of the message. At this point the notification unit 130 can send out the notification of the message arrival if no other delay is warranted.

Additionally, the modification unit 138 can modify the content of the message when the mood of the message does not match the mood of the receiver. When the content of the message contains at least one emoji then the modification unit 138 can change the emoji to match the mood of the receiver.

Figure 2:
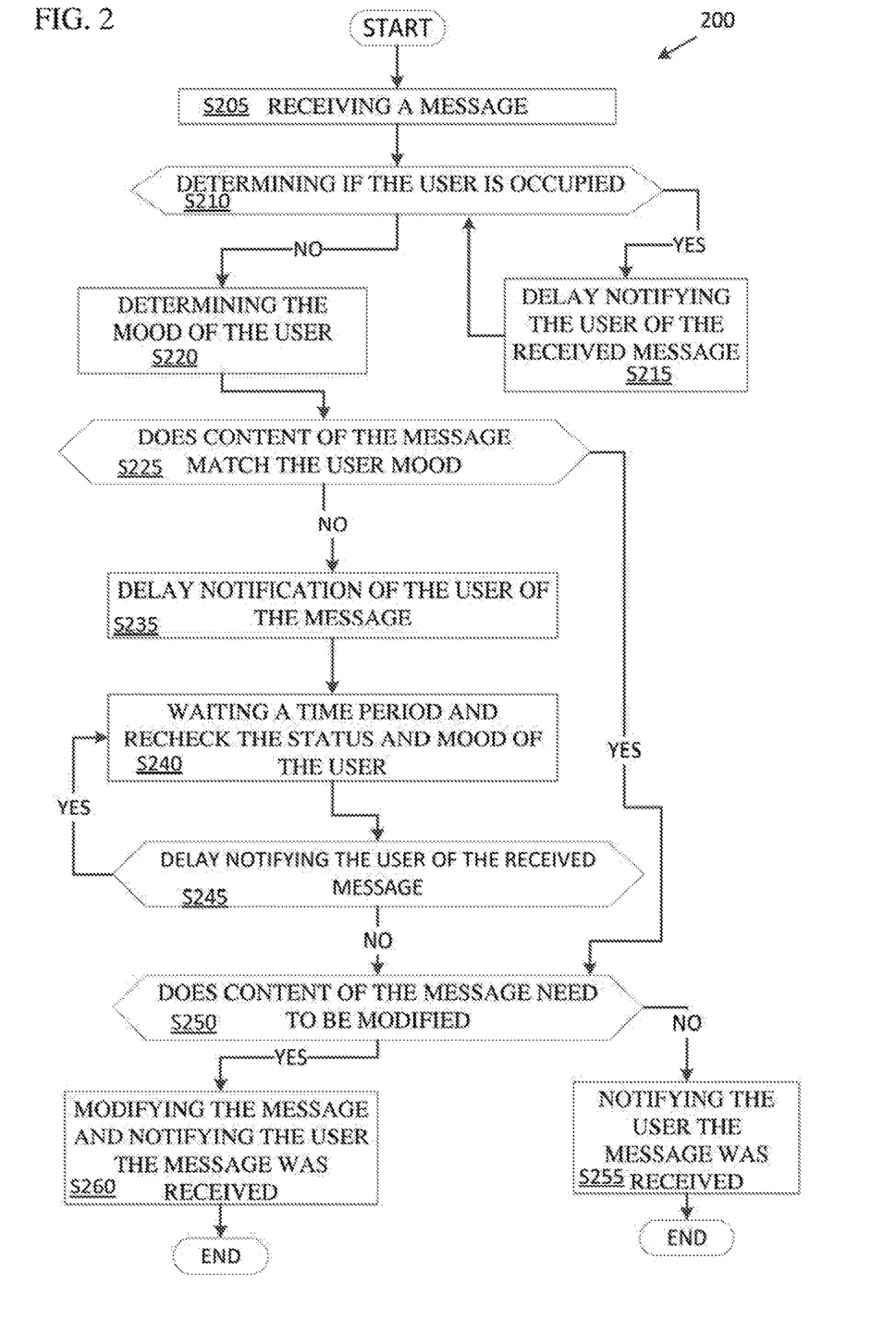
FIG. 2 is a flowchart depicting operational steps of automatically delaying notification and content modification in the messaging environment of FIG. 1, in accordance with an embodiment of the present invention.

FIG. 2 is a flowchart depicting operational steps of automatically delaying notification and content modification in the messaging environment 100 of FIG. 1, in accordance with an embodiment of the present invention.

The messaging application 128 on the receiver computing device 120 receives a message from a sender computing device 110 (S205). The occupied unit 132 determines if the receiver is occupied doing an activity, wherein the receiver status is determined from images from camera 124 and/or audio data from microphone 126 (S210). When the receiver is given a busy status, then the delay unit 136 delays the notification unit 130 from transmitting a notification to the receiver indicating that a new message has arrived (S215). The delay unit 136 periodically rechecks the receiver status to see if the status of the receiver has changed (S210). When the status of the receiver is not busy then the mood unit 134 determines the mood of the receiver and the mood of the content of the received message (S225). The mood unit 134 determines the mood of the receiver by using facial recognition to analyze images from camera 124 and/or by using speech/audio recognition to analyze audio data from microphone 126 (S225). The mood unit 134 utilizes natural language processing to determine the mood of the content of the message (S225). The delay unit 136 compares the mood of the receiver to the mood of the content of the message (S225). When the mood of the message and the mood of the receiver are the same or similar then the modification unit 138 determines if the content of the message needs to be modified (S250). When the mood of the receiver and the mood of the content of the message are different, then the delay unit 136 delays the notification unit from transmitting the notification of the arrival of the received message (S235). The mood unit 134 periodically rechecks the mood of the receiver to see if the receiver's mood has changed (S240). The delay unit 136 compares the mood of the receiver to the mood of the content of the message (S245). When the mood of the receiver and the mood of the content of the message are different, then the delay unit 136 delays the notification unit 130 from transmitting the notification of the arrival of the received message (S245). When the mood of the message and the mood of the receiver match or similar then the modification unit 138 determines if the content of the message need to be modified (S250). The modification unit 138 analyzes the content of the message to determine if the message contains content that can be modify without changing the message, for example, does the content contain emojis or other images (S250). When the message does not contain any content to be modified then the notification unit 130 transmits a notification to the user that a new message has arrived (S255). When the message does contain content to be modified, then the modification unit 138 changes the content to more reflect the mood of the receiver (S260). Once the content of the message has been modified then the notification unit 130 transmits a notification to the user that a new message has arrived (S260).

Figure 3:
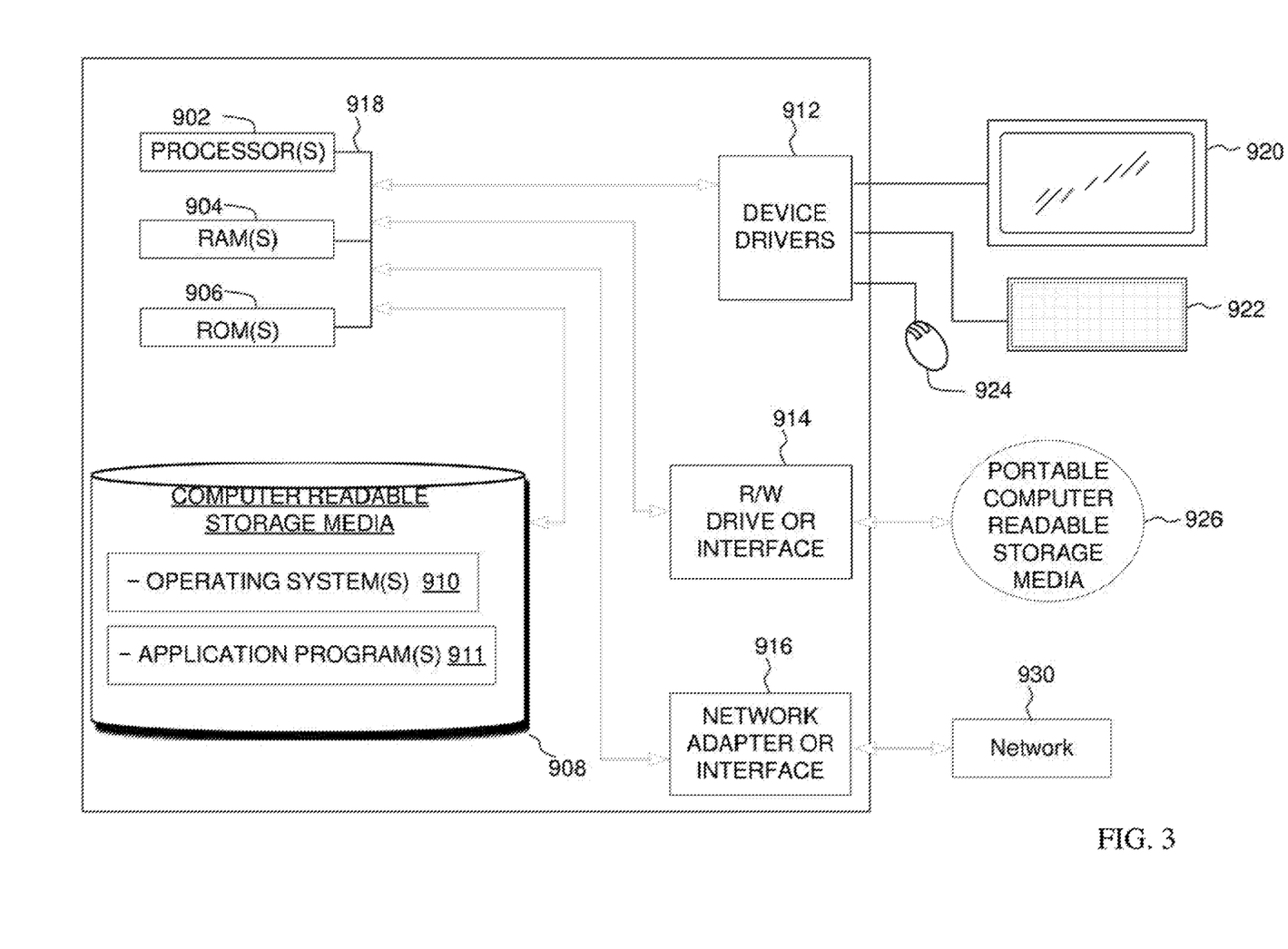
FIG. 3 is a block diagram of components of a computing device in the messaging processing environment of FIG. 1, in accordance with embodiments of the present invention.

FIG. 3 depicts a block diagram of components of receiver computing device 120, sender computing device 110, and user computing device 140 of messaging environment 100 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Sender computing device 110, receiver computing device 120, and user computing device 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, delay unit 136 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Sender computing device 110, receiver computing device 120, and user computing device 140 may also include a R/W drive or interface 914 to read from and write to one or more portable computer readable storage media 926. Application programs 911 on sender computing device 110, receiver computing device 120, and user computing device 140 may be stored on one or more of the portable computer readable storage media 926, read via the respective R/W drive or interface 914 and loaded into the respective computer readable storage media 908.

Sender computing device 110, receiver computing device 120, and user computing device 140 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on sender computing device 110, receiver computing device 120, and user computing device 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Sender computing device 110, receiver computing device 120, and user computing device 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and delay unit 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A method, the method comprising:
   receiving, by a computer, a message from a sending computing device;
   determining, by the computer, a first mood of a user receiving the message;

analyzing, by the computer, the content of the message to identify a second mood of the content of the message and to identify at least one mood indicator contained within the content of the message;

comparing, by the computer, the first mood to the second mood;

when the first mood does not match the second mood then determining, by the computer, if parts of the message can be modified without changing the content of the message;

modifying, by the computer, the at least one mood indicator contained within the content of the message to reflect the first mood; and delaying, by the computer, a transmission of a notification when the first mood and the second mood are different, wherein the notification is a sound or pop-up window that indicates the arrival of a message.

2. The method of claim 1, wherein determining, by the computer, the first mood of a user receiving the message comprises:

receiving, by the computer, an image data of the user receiving the message, wherein the image data includes a video or still images;

receiving, by the computer, audio data of the user receiving the message; and analyzing, by the computer, the image data and the audio data to determine the first mood of the user.

3. The method of claim 1, further comprising:

waiting, by the computer, a period of time before determining, by the computer, a third mood of the user receiving the messaging; and determining, by the computer, if the third mood is different from the first mood by comparing, by the computer, the first mood to the third mood.

4. The method of claim 3, further comprising:

when the third mood has been determined to be different then the first mood, then comparing, by the computer, the third mood of the user receiving the message to the second mood of the message;

determining, by the computer, that the third mood is the same or similar to the second mood; and transmitting, by the computer, the notification to the user.

5. The method of claim 1, further comprising:

determining, by the computer, a first status of the user receiving the message, wherein the status refers to the user being involved in an activity or not; and delaying, by the computer, a transmission of the notification when the first status is an occupied status.

6. The method of claim 5, wherein determining, by the computer, the first status of the user receiving the message comprises:

receiving, by the computer, image data of the user receiving the message, wherein the image data includes a video or still images;

receiving, by the computer, audio data of the user receiving the message; and analyzing, by the computer, the image data and the audio data to determine the first status of the user.

7. The method of claim 6, further comprising:

waiting, by the computer, a period of time before determining, by the computer, a second status of the user receiving the messaging; and determining, by the computer, if the second status is different from the first status by comparing, by the computer, the first status to the second status.

8. The method of claim 7, further comprising:

when the second status has been determined to be different then the first status, then determining, by the computer, that the second status is an unoccupied status; and transmitting, by the computer, the notification to the user.

9. A computer program product, the computer program product comprising:

one or more non-transitory computer-readable storage media and program instructions stored on the one or more non-transitory computer-readable storage media, the program instructions comprising:

program instructions to receive a message from a sending computing device;

program instructions to determine a first mood of a user receiving the message;

program instructions to analyze the content of the message to identify a second mood of the content of the message and to identify at least one mood indicator contained within the content of the message;

program instructions to compare the first mood to the second mood;

when the first mood does not match the second mood then program instructions to determine if parts of the message can be modified without changing the content of the message;

program instructions to modify the at least one mood indicator contained within the content of the message to reflect the first mood; and program instructions to delay a transmission of a notification when the first mood and the second mood are different, wherein the notification is a sound or pop-up window that indicates the arrival of a message.

10. The computer program product of claim 9, wherein program instructions to determine the first mood of a user receiving the message comprises:

program instructions to receive image data of the user receiving the message, wherein the image data includes a video or still images;

program instructions to receive audio data of the user receiving the message; and program instructions to analyze the image data and the audio data to determine the first mood of the user.

11. The computer program product of claim 9, further comprising:

program instructions to wait a period of time before determining a third mood of the user receiving the messaging; and program instructions to determine if the third mood is different from the first mood by comparing, by the computer, the first mood to the third mood.

12. The computer program product of claim 11, further comprising:

when the third mood has been determined to be different then the first mood, then comparing the third mood of the user receiving the message to the second mood of the message;

program instructions to determine that the third mood is the same or similar to the second mood; and program instructions to transmit the notification to the user.

13. The computer program product of claim 9, further comprising:
   program instructions to determine a first status of the user receiving the message, wherein the status refers to the user being involved in an activity or not; and
   program instructions to delay a transmission of the notification when the first status is an occupied status.

14. The computer program product of claim 13, wherein program instructions to determine the first status of the user receiving the message comprises:
   program instructions to receive image data of the user receiving the message, wherein the image data includes a video or still images;
   program instructions to receive audio data of the user receiving the message; and
   program instructions to analyze the image data and the audio data to determine the first status of the user.

15. The computer program product of claim 14, further comprising:
   program instructions to wait a period of time before determining a second status of the user receiving the messaging; and
   program instructions to determine if the second status is different from the first status by comparing, by the computer, the first status to the second status.

16. The computer program product of claim 15, further comprising:
   when the second status has been determined to be different then the first status, then determining that the second status is an unoccupied status; and
   program instructions to transmit the notification to the user.

17. A computer system, the computer system comprising:
   one or more computer processors, one or more computer-readable storage media, and program instructions stored on the one or more of the computer-readable storage media for execution by at least one of the one or more processors, the program instructions comprising:
   program instructions to receive a message from a sending computing device;
   program instructions to analyze the content of the message to identify a second mood of the content of the message and to identify at least one mood indicator contained within the content of the message;
   program instructions to determine a second mood of the content of the message;
   program instructions to compare the first mood to the second mood;
      when the first mood does not match the second mood then program instructions to determine if parts of the message can be modified without changing the content of the message;
   program instructions to modify the at least one mood indicator contained within the content of the message to reflect the first mood; and
   program instructions to delay a transmission of a notification when the first mood and the second mood are different, wherein the notification is a sound or pop-up window that indicates the arrival of a message.

18. The system of claim 17, wherein program instructions to determine the first mood of a user receiving the message comprises:
   program instructions to receive image data of the user receiving the message, wherein the image data includes a video or still images;
   program instructions to receive audio data of the user receiving the message; and
   program instructions to analyze the image data and the audio data to determine the first mood of the user.

* * * * *